(12) United States Patent
Todd et al.

(10) Patent No.: US 10,789,179 B1
(45) Date of Patent: Sep. 29, 2020

(54) DECENTRALIZED ACCESS MANAGEMENT IN INFORMATION PROCESSING SYSTEM UTILIZING PERSISTENT MEMORY

(71) Applicant: EMC IP Holding Company LLC, Hopkinton, MA (US)

(72) Inventors: Stephen J. Todd, Shrewsbury, MA (US); Kenneth Durazzo, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 15/895,653

(22) Filed: Feb. 13, 2018

Related U.S. Application Data

(63) Continuation-in-part of application No. 15/727,280, filed on Oct. 6, 2017, now Pat. No. 10,452,295.

(51) Int. Cl.
*G06F 12/14* (2006.01)
*H04L 9/08* (2006.01)
(Continued)

(52) U.S. Cl.
CPC ........ *G06F 12/1458* (2013.01); *G06F 21/602* (2013.01); *H04L 9/0637* (2013.01);
(Continued)

(58) Field of Classification Search
CPC .............. G06F 12/1458; G06F 21/602; G06F 2212/1052; G06F 2212/154; H04L 9/0637;
(Continued)

(56) References Cited

U.S. PATENT DOCUMENTS 8,799,680 B2 * 8/2014 Ferguson ............ G06F 12/1408
705/51
8,850,540 B2 * 9/2014 Lin ..................... H04L 63/0428
380/28
(Continued)

FOREIGN PATENT DOCUMENTS

CN          103491180 A   *  1/2014
WO      WO-2017211623 A1  * 12/2017  .......... H04W 12/003

OTHER PUBLICATIONS

Vasily A. Sartakov, et al., Multi-site Synchronous VM Replication for Persistent Systems with Asymmetric Read/Write Latencies, Jun. 2017, 2017 IEEE 22nd Pacific Rim International Symposium on Dependable Computing (PRDC), pp. 1-10.*
(Continued)

*Primary Examiner* — Farid Homayounmehr
*Assistant Examiner* — Raied A Salman
(74) *Attorney, Agent, or Firm* — Ryan, Mason & Lewis, LLP

(57) ABSTRACT

In an information processing system comprising a set of computing devices wherein each computing device comprises a set of persistent memory modules resident in the computing device, and wherein one or more data structures associate one or more application programs executing on the set of computing devices with one or more memory regions of the set of persistent memory modules such that the one or more data structures are utilized to route data between a given one of the application programs and at least one memory region, maintaining a distributed ledger system with a plurality of nodes, wherein the set of computing devices is operatively coupled to the plurality of nodes of the distributed ledger system, and managing one or more data access requests by a given application program to a memory
(Continued)

region of a persistent memory module in consultation with the distributed ledger system.

20 Claims, 12 Drawing Sheets

(51) Int. Cl.
*H04L 9/32* (2006.01)
*G06F 21/60* (2013.01)
*H04L 9/06* (2006.01)

(52) U.S. Cl.
CPC .......... *H04L 9/0816* (2013.01); *H04L 9/3242* (2013.01); *G06F 2212/1052* (2013.01); *G06F 2212/154* (2013.01)

(58) Field of Classification Search
CPC ..... H04L 9/0816; H04L 9/3242; H04L 67/10; H04L 9/0643; H04L 9/3236; H04L 2209/56
See application file for complete search history.

(56) References Cited

U.S. PATENT DOCUMENTS

| | | | | |
|---|---|---|---|---|
| 9,059,988 | B2* | 6/2015 | Choi | G06F 21/608 |
| 9,122,510 | B2* | 9/2015 | Amies | G06F 9/45558 |
| 9,122,533 | B2* | 9/2015 | Carter | G06F 9/505 |
| 9,213,609 | B2* | 12/2015 | Hansen | G06F 11/2097 |
| 9,420,034 | B2* | 8/2016 | Cai | H04L 67/10 |
| 9,613,190 | B2* | 4/2017 | Ford | G06F 21/10 |
| 9,705,706 | B2* | 7/2017 | John | H04L 12/2874 |
| 9,966,135 | B2* | 5/2018 | Ahn | G11C 13/0033 |
| 10,108,954 | B2* | 10/2018 | Dunlevy | G06Q 20/36 |
| 10,115,092 | B1* | 10/2018 | Bryan | G06Q 20/123 |
| 10,303,895 | B1* | 5/2019 | McCluskey | G06F 21/6245 |
| 10,452,295 | B1* | 10/2019 | Todd | G06F 3/0688 |
| 10,638,315 | B2* | 4/2020 | Kim | H04M 1/66 |
| 2008/0141067 | A1* | 6/2008 | Nautiyal | G11C 29/84 714/6.12 |
| 2011/0235546 | A1* | 9/2011 | Horn | H04W 48/17 370/254 |
| 2012/0096217 | A1 | 4/2012 | Son et al. | |
| 2014/0073289 | A1* | 3/2014 | Velasco | H04W 12/04031 455/411 |
| 2014/0195564 | A1 | 7/2014 | Talagala et al. | |
| 2014/0215583 | A1* | 7/2014 | Ding | H04W 12/06 726/5 |
| 2014/0348062 | A1* | 11/2014 | Anwar | H04W 28/08 370/328 |
| 2016/0034419 | A1 | 2/2016 | Romem et al. | |
| 2016/0147506 | A1* | 5/2016 | Britt | H04L 67/10 717/107 |
| 2016/0242194 | A1* | 8/2016 | Mitola | H04W 72/12 |
| 2016/0270141 | A1* | 9/2016 | Sharma | H04W 76/16 |
| 2017/0006513 | A1* | 1/2017 | Lee | H04W 36/02 |
| 2017/0041859 | A1* | 2/2017 | Martin | H04W 48/16 |
| 2017/0085538 | A1* | 3/2017 | Dooley | H04L 63/0435 |
| 2017/0126654 | A1* | 5/2017 | Fu | H04L 9/3226 |
| 2017/0277466 | A1 | 9/2017 | Weld et al. | |
| 2017/0289799 | A1* | 10/2017 | Hawkes | H04L 63/0892 |
| 2017/0347272 | A1* | 11/2017 | Ahmavaara | H04W 16/14 |
| 2018/0227835 | A1* | 8/2018 | Martin | H04W 48/14 |
| 2018/0234396 | A1* | 8/2018 | Adams | H04L 63/0428 |
| 2018/0285009 | A1 | 10/2018 | Guim Bernat et al. | |
| 2018/0301188 | A1* | 10/2018 | Choi | G11C 5/066 |
| 2018/0302941 | A1* | 10/2018 | Li | H04L 45/24 |
| 2018/0343111 | A1* | 11/2018 | Chen | G06F 21/60 |
| 2018/0376411 | A1* | 12/2018 | Rinne | H04W 48/18 |
| 2019/0020214 | A1* | 1/2019 | Ho | H02J 7/027 |
| 2019/0026026 | A1* | 1/2019 | Benedict | G06F 3/068 |
| 2019/0028475 | A1* | 1/2019 | Back | H04L 63/0876 |
| 2019/0050573 | A1* | 2/2019 | Connor | G11C 11/34 |
| 2019/0089537 | A1* | 3/2019 | Gray | H04L 9/0894 |
| 2019/0102568 | A1* | 4/2019 | Hausauer | H04L 63/0428 |
| 2019/0159268 | A1* | 5/2019 | Nilsson | H04W 76/10 |
| 2020/0022008 | A1* | 1/2020 | Magee | H04W 24/08 |

OTHER PUBLICATIONS

Iang Liang, et al., A Case for Virtualizing Persistent Memory, SoCC '16: Proceedings of the Seventh ACM Symposium on Cloud Computing, Oct. 2016, pp. 126-140.*

U.S. Appl. No. 15/727,280 filed in the name of Stephen Todd et al. filed Oct. 6, 2017 and entitled "Data Routing in Information Processing System Utilizing Persistent Memory."

M. Ali et al., "Blockstack: A Global Naming and Storage System Secured by Blockchains," Proceedings of the 2016 USENIX Annual Technical Conference, Jun. 2016, p. 181-194.

Satoshi Nakamoto, "Bitcoin: A Peer-to-Peer Electronic Cash System," http://bitcoin.org/bitcoin.pdf, 2008, 9 pages.

\* cited by examiner

```
Ledger
Transaction
{
  OP="PMEM Binding"
  ID= ERP/Tenant B"
  PMEM={
    HashA, HashB, HashC, HashD
  }
  Pubkey= "abc13sdf"
}
```

DECENTRALIZED ACCESS MANAGEMENT IN INFORMATION PROCESSING SYSTEM UTILIZING PERSISTENT MEMORY

CROSS REFERENCE TO RELATED APPLICATION

The present application is a continuation-in-part of, and therefore claims priority to, U.S. patent application Ser. No. 15/727,280, entitled "Data Routing in Information Processing System Utilizing Persistent Memory" filed Oct. 6, 2017, the disclosure of which is incorporated by reference herein in its entirety.

FIELD

The field relates generally to information processing systems, and more particularly to techniques for access management in information processing systems that utilize persistent memory.

BACKGROUND

By way of example, an information processing system may comprise a set of computing devices (e.g., servers) that host one or more application programs (applications) that utilize and generate data that is stored in a data storage system. In information processing systems that implement virtualization to provide a layer of abstraction over the physical server hardware, the applications are typically executed by one or more compute nodes in virtual processing elements or virtual processors such as, for example, containers or virtual machines. The input and output data associated with execution of an application is stored or persisted within the particular data storage system implemented by the information processing system.

Furthermore, the set of computing devices of the information processing system may be part of a data center in the form of a cloud-based computing environment which hosts applications for multiple tenants. The cloud-based computing environment may employ existing cloud services such as Platform-as-a-Service (PaaS) and Infrastructure-as-a-Service (IaaS) that enable efficient development and deployment of applications for application developers and owners.

As new applications are composed (e.g., microservices) or imposed (e.g., monolithic or legacy applications) via containers and onto a PaaS or IaaS, this creates challenges to the binding of applications to persistent data. Today's containers are distributed across available infrastructure components, and binding is carried out via centralized non-volatile primary storage. The binding is called out in manifests when the applications are composed. The current method of binding containers to primary storage is based upon existing data access methods (e.g., retrieve from primary storage such as storage arrays and load into memory resident on the host).

Thus, applications have typically stored their data between two tiers, i.e., a memory tier and a storage tier. However, persistent storage (referred to as PMEM) has begun to find use in some information processing systems. PMEM is accessed in a similar manner as volatile memory (e.g., dynamic random-access memory or DRAM) using processor load and store instructions; however, PMEM persists data in a non-volatile manner similar to a storage array.

While information processing systems utilizing PMEM have been proposed, access by unauthorized containers is realized to be a problem.

SUMMARY

Embodiments of the invention provide techniques for decentralized access management in information processing systems that utilize persistent memory.

For example, in one illustrative embodiment, a method comprises the following steps. In an information processing system comprising a set of computing devices wherein each computing device comprises a set of persistent memory modules resident in the computing device, and wherein one or more data structures associate one or more application programs executing on the set of computing devices with one or more memory regions of the set of persistent memory modules such that the one or more data structures are utilized to route data between a given one of the application programs and at least one memory region, the method comprises maintaining a distributed ledger system with a plurality of nodes, wherein the set of computing devices is operatively coupled to the plurality of nodes of the distributed ledger system. The method further comprises managing one or more data access requests by a given application program to a memory region of a persistent memory module in consultation with the distributed ledger system by storing transaction data in the distributed ledger system that represents at least one of routing information, identity information, and binding information associated with the one or more application programs and the set of persistent memory modules.

Advantageously, in illustrative embodiments, the distributed ledger system provides a secure and immutable decentralized mechanism for managing data access in an information processing system that utilizes persistent memory.

These and other features and advantages of the invention will become more readily apparent from the accompanying drawings and the following detailed description.

BRIEF DESCRIPTION OF THE DRAWINGS

FIG. 10 illustrates a ledger transaction containing binding information, according to an illustrative embodiment.

DETAILED DESCRIPTION

Figure 1:
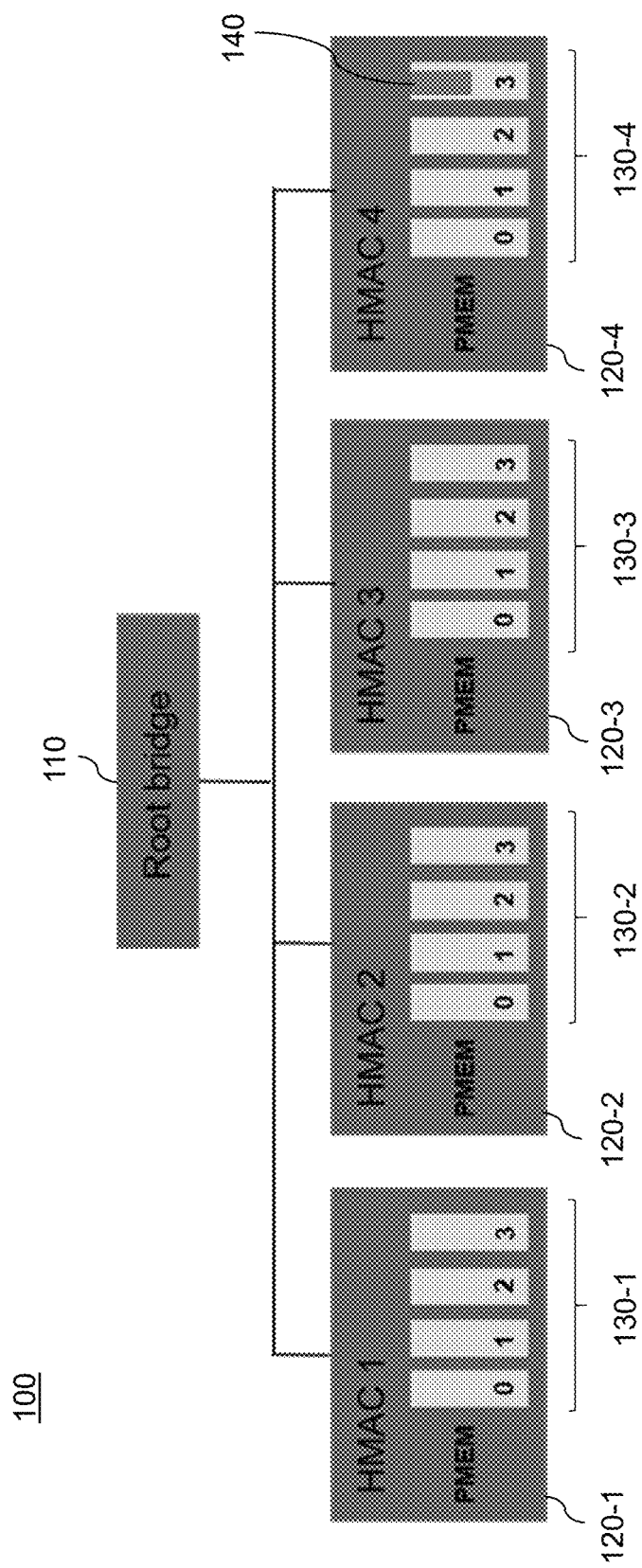
FIG. 1 illustrates a server configuration with persistent memory in accordance with which one or more illustrative embodiments may be implemented.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure.

As mentioned above in the background section, information processing systems utilizing DRAM currently use existing data access methods to bind containers to centralized non-volatile primary storage. However, it is realized that persistent memory (PMEM) may be used to replace DRAM and further, because of its non-volatile persistent nature, PMEM allows for persistent storage inside each server (i.e., decentralized storage) that is byte addressable and thus can also serve as a replacement for primary data storage. However, it is also realized that as PMEM becomes the primary data store, several challenges arise, for example: (i) data access semantics will no longer be block/file/object; (ii) data will be stored in decentralized servers, not centralized storage devices such as storage arrays; (iii) applications will no longer be able to directly access stored bytes via the use of universal resource identifiers or URIs (e.g., file/directory names); (iv) orchestration systems, which are not currently PMEM-aware, will either need to place containers physically proximate to the stored bytes or will at least need to know where the data is physically located during container placement; (v) as data becomes increasingly distributed across multiple PMEM systems, managing a uniform data access methodology and understanding physical mappings across private and public domains is currently not possible; (vi) PMEM-based storage does not currently have the ability to be partitioned among multiple tenants so as to prevent unauthorized access on shared PMEM storage; and (vii) PMEM-based storage presents a data protection challenge in that it currently has no ability to track where redundant copies are located and how those copies are being updated and/or synchronized.

The above-referenced U.S. patent application Ser. No. 15/727,280, entitled "Data Routing in Information Processing System Utilizing Persistent Memory," filed Oct. 6, 2017, the disclosure of which is incorporated by reference herein in its entirety, describes techniques to overcome the above and other drawbacks associated with replacing existing centralized primary storage with PMEM-based storage. More particularly, illustrative embodiments provide techniques for routing data in information processing systems that utilize PMEM as primary data storage. Some embodiments of these routing techniques are described below in the context of FIGS. 1-5.

FIG. 1 illustrates a server configuration with PMEM serving as primary data storage in accordance with which one or more illustrative embodiments may be implemented. As shown, network-connected server configuration 100 comprises a root bridge 210 operatively coupling a set of servers 120-1, 120-2, 120-3 and 120-4. Of course, the number of servers may be more or less than the illustrative number shown in FIG. 1. Each server includes a set of dual inline memory module (DIMM) slots that each contain a PMEM module. Thus, as shown, servers 120-1, 120-2, 120-3 and 120-4 respectively include a set of DIMM slots 130-1, 130-2, 130-3 and 130-4 with PMEM installed. Again, while each set of DIMM slots is illustrated with four slots (0, 1, 2, and 3), there can be more or less slots in a given server configuration. Note that each server is designated with a host media access control (HMAC) address, i.e., server 120-1 as HMAC1, server 120-2 as HMAC2, server 120-3 as HMAC3, and server 120-4 as HMAC4. A HMAC address is typically associated with a server's network interface controller (NIC) and is used to uniquely identify the server for data communication purposes.

In accordance with illustrative embodiments, routing structures (constructs) are used to identify any given memory region within the PMEM modules at any of the servers depicted in FIG. 1. By way of example only, such a routing structure can be used to identify memory region 140 highlighted in HMAC4:DIMM3 of FIG. 1. These networking constructs, which allow for the binding of source and destination addresses, can be used to bind and accurately map applications to their PMEM data locations.

Figure 2:
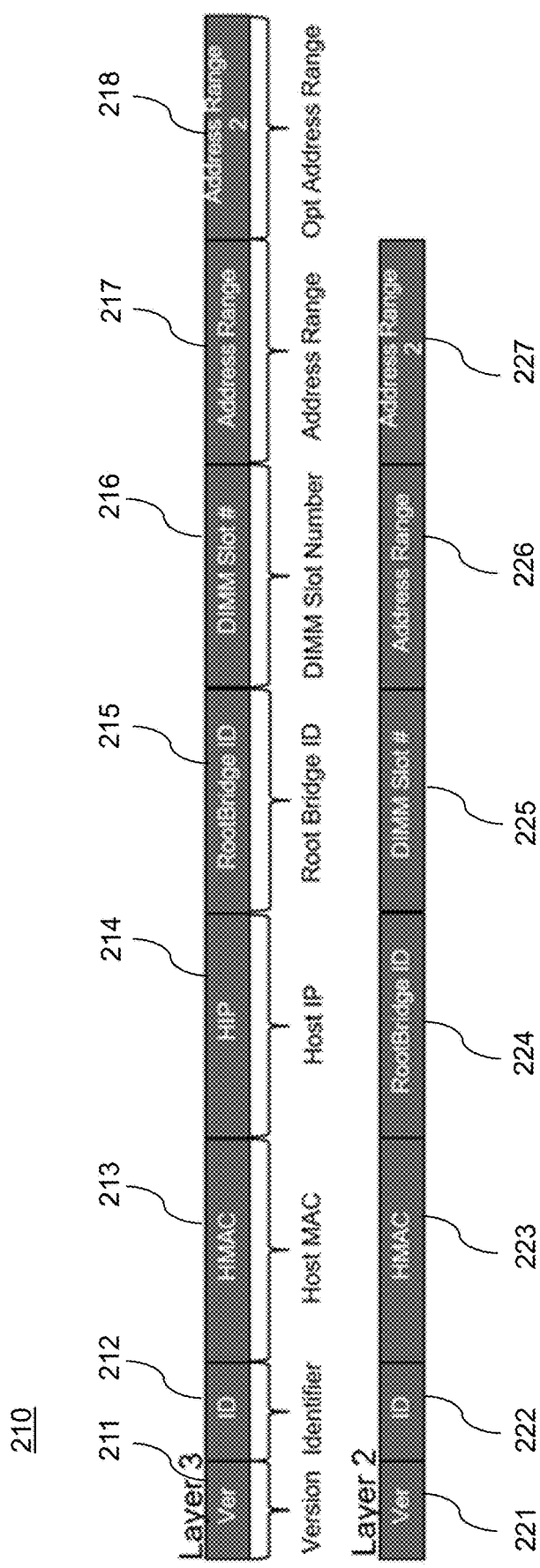
FIG. 2 illustrates routing structures used to identify persistent memory locations, according to an illustrative embodiment.

FIG. 2 illustrates examples of two such routing structures that can be used to identify persistent memory locations, according to an illustrative embodiment. The two routing structures are illustrated in the context of the Open Systems Interconnection (OSI) model including the data-link layer (layer 2) and the network layer (layer 3). It is to be appreciated, however, that alternative embodiments may have routing structures that are different than the OSI examples shown in FIG. 2. It is to be further understood that the routing structures, in illustrative embodiments, serve as headers for packet content and may be appended to or otherwise associated with packet data structures.

As shown, layer 3 routing structure 210 comprises a Version field 211, an Identifier field 212, a Host MAC (HMAC) field 213, a Host Internet Protocol (IP) address field 214, a Root Bridge identifier (ID) field 215, a DIMM Slot Number field 216, an Address Range field 217 and a second (optional) Address Range field 218. Layer 2 routing structure 220 comprises a Version field 221, an Identifier field 222, a Host MAC (HMAC) field 223, a Root Bridge identifier (ID) field 224, a DIMM Slot Number field 225, an Address Range field 226 and a second (optional) Address Range field 227. It is to be appreciated that the routing structures shown in FIG. 2 may have additional fields that are not shown for the sake of simplicity of illustration and explanation. One of ordinary skill in the art will appreciate which additional fields that are not expressly shown may be part of the routing structure.

The Version field (211 and 221) specifies the IP version of the given network in which the servers are deployed. The Identifier field (212 and 222) specifies the entity or function with which corresponding packets are associated. The HMAC field (213 and 223) specifies the Host MAC address of a given server. The Host IP field (214) specifies the IP address of a given server (note that this field is present in the network layer routing structure 210 but not the data link layer routing structure 220). The Root Bridge ID field (215 and 224) specifies the identifier for the root bridge connecting a given set of servers. The DIMM Slot Number field (216 and 225) specifies the DIMM slot in which a given PMEM module is installed. The Address Range field (217 and 226) specifies the address range of a specific memory region on a given PMEM module. The (optional) Address Range 2 field (218 and 227) specifies the address range of another specific memory region on a given PMEM module.

Figure 3:
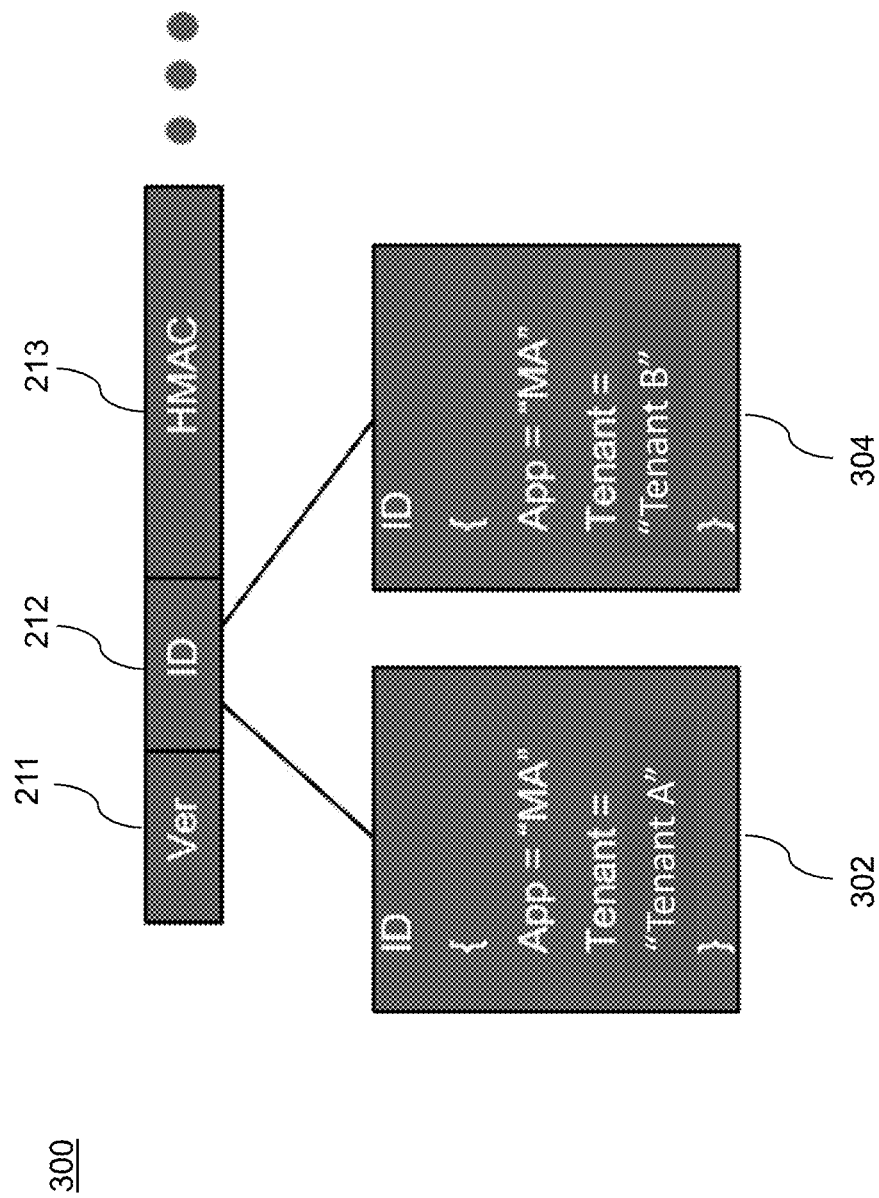
FIG. 3 illustrates a process of embedding application and tenant identifiers into a routing structure, according to an illustrative embodiment.

One key aspect of an illustrative embodiment is the embedding of application and tenant information into the Identifier field (212 and 222). This approach allows for specific PMEM memory regions to be dedicated to tenants that are running specific applications. FIG. 3 illustrates a process of embedding application and tenant tags (identifiers) into a routing structure, according to an illustrative embodiment. More particularly, process 300 in FIG. 3 depicts how two different tenants 302 and 304 (e.g., Tenant A and Tenant B, respectively) running the same application (MarketingApp or MA) can be described within the Identifier field of a given routing structure (e.g., routing structure 210 in FIG. 2). It is to be appreciated that the data within the field 212 can be represented in any suitable data format (e.g., bits, ascii, etc.).

It is to be appreciated that the use of such routing structures (or more generally, data structures) described above results in many benefits for an information processing system that employs PMEM as primary data storage.

For example, illustrative embodiments depicted in and described in the context of FIG. 2 enable global data reachability at the data addressability layer. Furthermore, by building application/tenancy information into the routing structure, this global data reachability can be constrained to specify tenant ownership of specific persistent memory locations. Still further, the routing structures described in the context of FIG. 2 represent a uniform application/tenant/PMEM binding approach for identifying any PMEM memory region across any data center (as well as tying that region to a specific tenant and application).

In accordance with one or more illustrative embodiments, a routing structure shown in FIG. 2 (210 or 220), or a portion thereof, can be represented as a unique hash value. This hash value can be used as a "shorthand" way to track the mappings. It is to be understood that the mapping or binding created herein refers to the association created within the routing structure between a given application/tenant and a specific PMEM memory region location in a specific server. Therefore, a set of PMEM locations can be associated with a certain application/tenant, as further explained in the context of FIG. 4.

Figure 4:
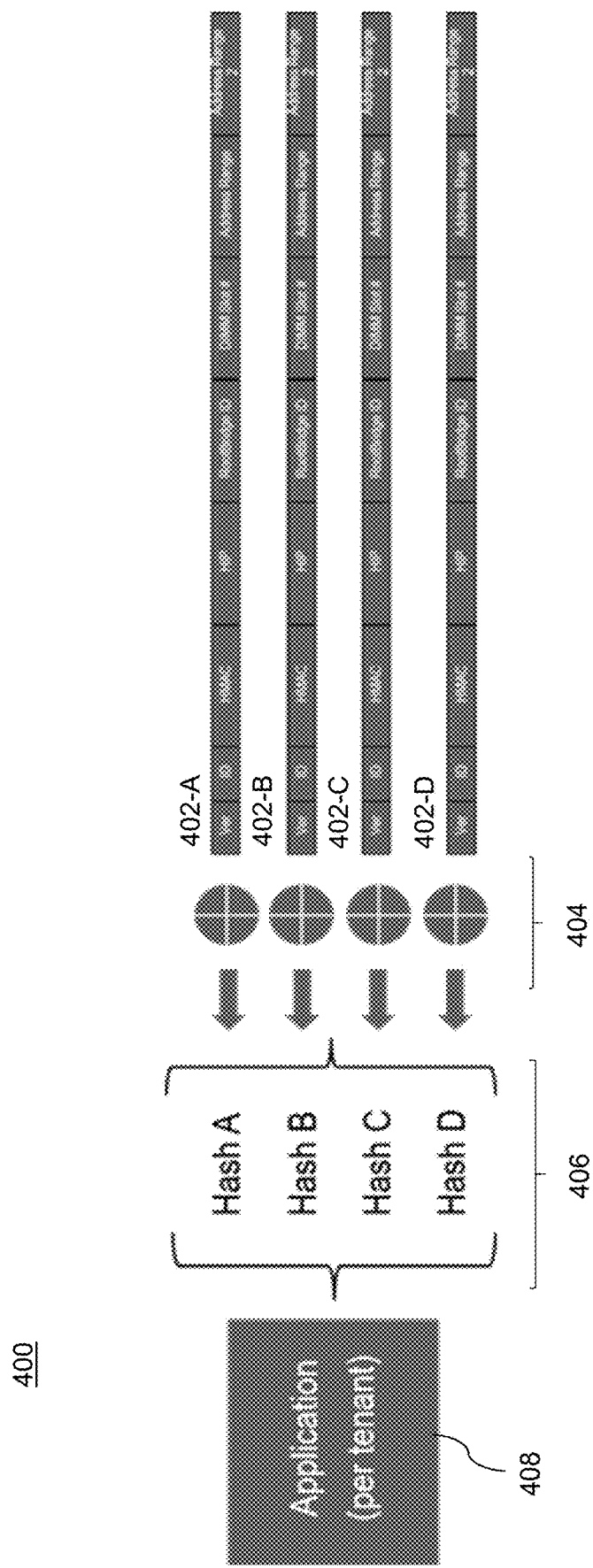
FIG. 4 illustrates a process of application region mapping via hash values, according to an illustrative embodiment.

FIG. 4 illustrates a process 400 of application region mapping via hash values, according to an illustrative embodiment. More particularly, for each of a set of PMEM locations respectively represented by routing structures 402-A, 402-B, 402-C and 402-D, a hash function 404 is applied to the routing structure to generate a respective set of hash values 406, i.e., hash value A corresponds to routing structure 402-A, hash value B corresponds to routing structure 402-B, hash value C corresponds to routing structure 402-C, and hash value D corresponds to routing structure 402-D. These hash values are thus hashes of the PMEM location mappings for a given application for a given tenant. The given application and tenant are specified in the ID field of the routing structure as illustrated and previously described above in the context of FIGS. 2 and 3.

It is to be appreciated that the hash function 404 applied to each routing structure can be a conventional hash function, and can be different for two or more of the routing structures. Also, in a similar manner as shown in process 400, routing structures that relate to the same application but different tenants can be mapped to the given application. Still further, routing structures for the same tenant but different applications can be mapped to the given tenant.

Advantageously, the routing structures according to illustrative embodiments provide the following important information about each PMEM memory region distributed across a set of servers in an information processing system: (i) a unique memory address (extended as needed for a given data set); (ii) location (how to reach the memory region); and (iii) identification (which host or server the memory region is in).

This information allows the creation of a routing table built as a distributed hash table (DHT), which allows the information processing system to pinpoint a particular host for a specific PMEM memory address space. Recall that the information processing system could be implemented as a public cloud, a private cloud, or some hybrid combination of both.

Figure 5:
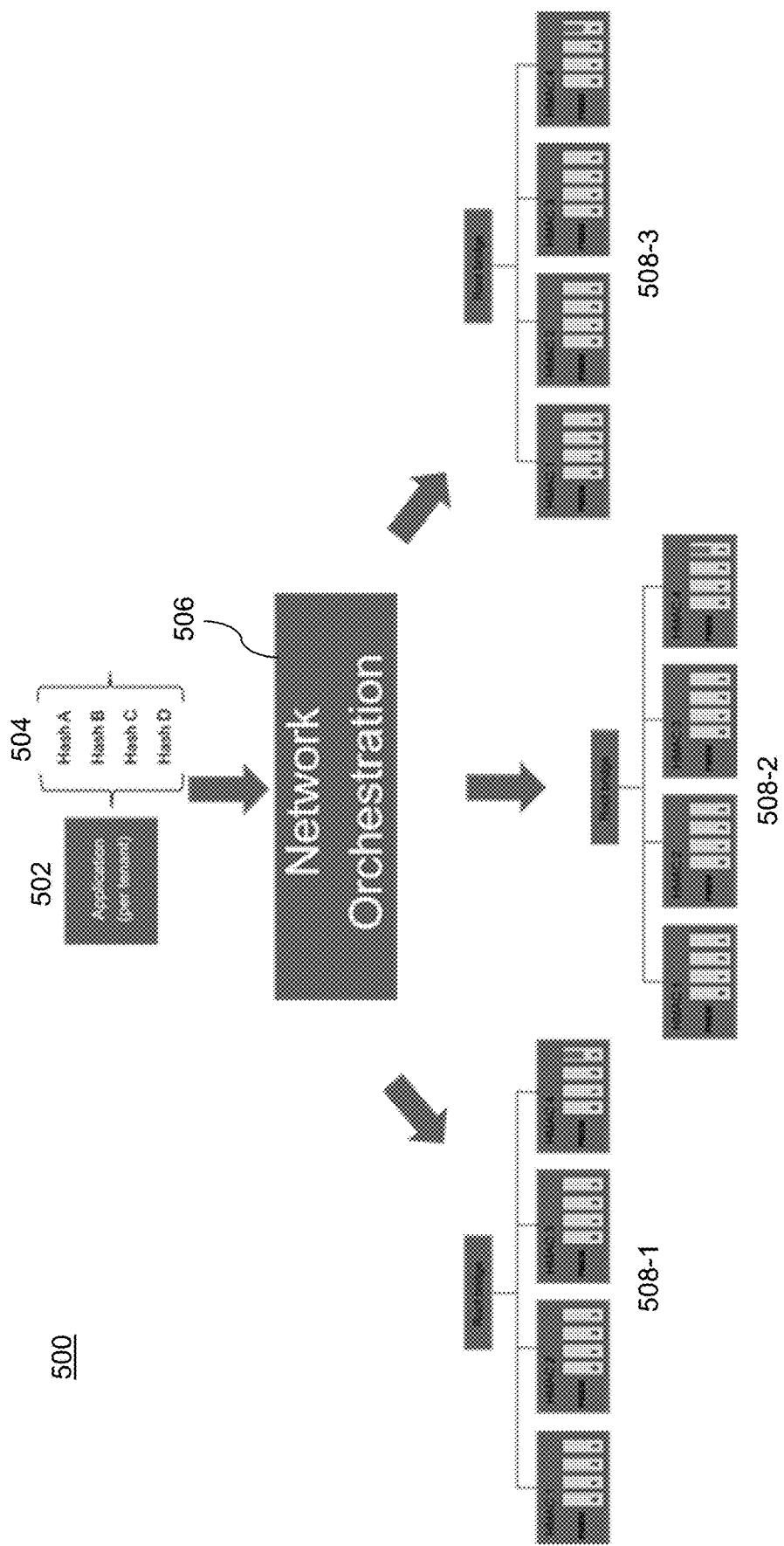
FIG. 5 illustrates a process of leveraging hash values to map applications to data centers, according to an illustrative embodiment.

When an application is scheduled to begin running, the orchestration software of the information processing system can access the hash values assigned to a given application and tenant. These hash values allow the orchestration software to know: (i) the network path; and (ii) the physical PMEM locations that have been allocated specifically to that application. FIG. 5 illustrates a process 500 of leveraging hash values to map applications to data centers, according to an illustrative embodiment. As shown, assume that for a given application and tenant 502, a set of hash values 504 are generated (as described above) for a set of PMEM memory regions in which data is persisted for the given application/tenant. Process 500 in FIG. 5 highlights the ability of networking orchestration software 506 to choose the appropriate data center among a set of data centers 508-1, 508-2 and 508-3 based on the hash values 504. Note that each data center in FIG. 5 is illustratively represented by an information processing system 100 as shown in FIG. 1, although a given data center may have more or less servers with PMEM used for primary data storage. Note also that two or more of the data centers can be at different geographic locations. Likewise, two or more servers within a given data center can be at different geographic locations.

By utilizing the above-described allocation of PMEM storage to a given application, containers can then be instantiated and mapped to their corresponding PMEM locations using a DHT. These containers can then begin to access persistent storage using byte-addressable semantics.

Changes to the routing structure, to the memory structure, concatenation/expansion of data, movement of data (e.g. from DIMM1 to DIMM4), etc., all cause a recalculation of the hash and hash table. Changes to the hash and the hash table can be trapped and trigger communication with management and orchestration (M&O) frameworks and/or applications/application management systems.

Accordingly, the PMEM routing framework described above in the context of FIGS. 1-5 allows an application (e.g., one or more containers) to be placed onto the specific server facilitating local load/store semantics to the application tenant's persistent data. Such an approach enables applications to find their persistent memory through the use of routing constructs (e.g., FIG. 2) that specify root bridge, server, and memory bank pathing. This decentralized approach, however, can lead to challenges in preventing unauthorized access during system operation. These problems are described below.

Recall that FIG. 1 depicts a configuration with a server (HMAC4) containing PMEM (slots 0-3) with a storage segment 140 dedicated to a specific application and tenant (PMEM slot 3).

Figure 6:
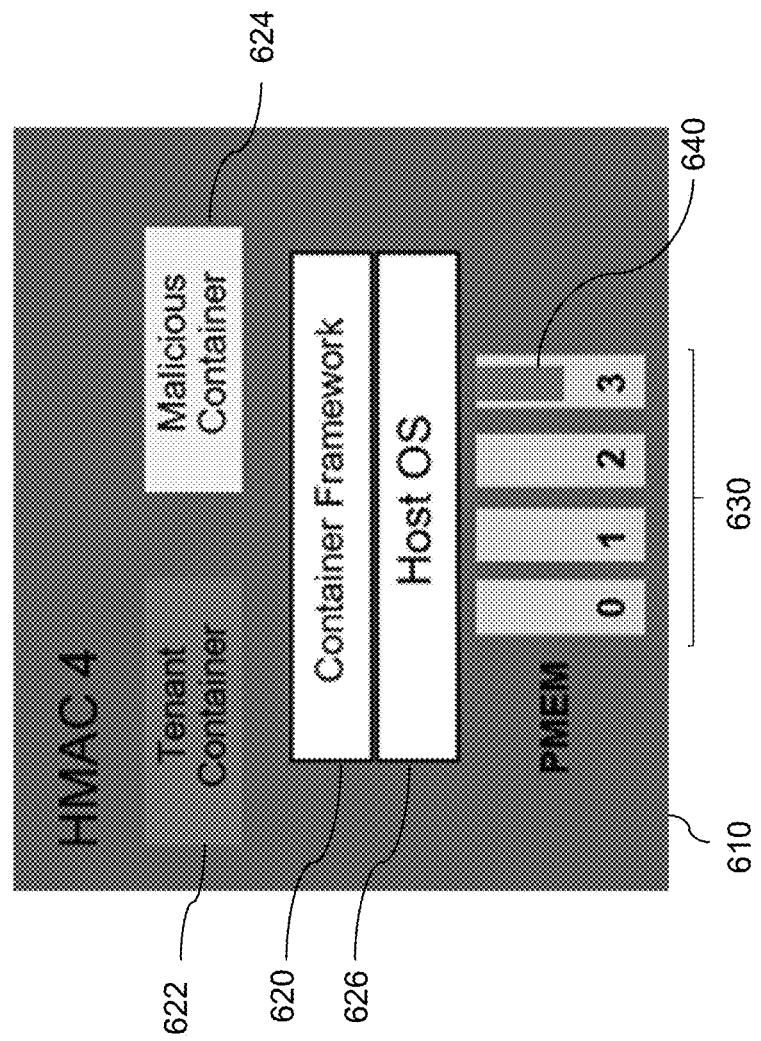
FIG. 6 illustrates an example of a malicious container attempting to access data stored in persistent memory in an information processing system within which one or more illustrative embodiments may be implemented.

FIG. 6 illustrates an example 600 with further details of the HMAC 4 server. More particularly, the server 610 comprises a container framework 620 with two different containers, i.e., a tenant container 622 and a malicious container 624, attempting to access the data fragment 640 in PMEM 3 (part of the set of PMEM modules 630 in server 610). Note that the container framework 620 operates functionally on top of the host operating system (OS) 626.

Traditional (centralized) persistent storage implementations use a variety of approaches to prevent unauthorized (malicious) persistent storage access (e.g., access control lists (ACLs) on network attached storage (NAS) file systems). The shift towards persistent memory raises a number of access challenges, which are described below.

Tenant Identity During Container Instantiation

PMEM routing tables, as described above, support the dedication of PMEM regions to specific tenants running specific applications. However, there is currently no mechanism for local servers to verify the container's tenant identity during container instantiation.

Tenant Impersonation

If a malicious actor is able to impersonate a tenant (in the form of a malicious container such as 624 in FIG. 6), they will have unauthorized access to the PMEM storage.

Accessible Tenancy/Application Catalogue

Each local server will need to consult a catalogue of known tenant/application pairings. There is currently no such catalogue to consult for the PMEM data routing framework.

Removals/Additions of Tenants

As the PMEM data routing framework allocates new application and tenant pairings to introduce into the system, there is no mechanism for proliferating this information as part of a distributed catalog that is accessible to all data centers that are accessible to those tenants.

Similarly, if a tenant/application is removed from the system there is no mechanism to record this fact across all data centers. This could result in a malicious actor attempting to use a stale tenant/application handle in order to access PMEM storage.

Shared PMEM Storage

Should multiple applications desire to share PMEM storage access, there is currently no way to allow multiple applications to share access to the PMEM storage location.

Hardware Impersonation

PMEM data center providers use root bridge and HMAC routing tables to specify routing access to PMEM data. A malicious data center operator can attempt to duplicate that configuration as a way of steering data center requests to a rogue data center.

Illustrative embodiments overcome these and other challenges by providing decentralized access management in information processing systems utilizing PMEM and implementing a PMEM data routing framework as described above in the context of FIGS. 1-5.

As will be explained in detail below, illustrative embodiments provide a secure, distributed ledger system that is locally accessible to all PMEM servers (e.g., all servers in each data center shown in FIG. 5). The ledger system provides a trusted view into the currently approved list of tenants/applications and the PMEM regions that are accessible to them. In some illustrative embodiments, the ledger system may employ Blockstack and blockchain technologies, although alternative embodiments are not limited thereto. Thus, before describing illustrative embodiments of the ledger system in the context of FIGS. 7-11, some general concepts associated with Blockstack and blockchain technologies will first be described.

In one or more illustrative embodiments, a decentralized identity management system known as "Blockstack" is adapted for use in the PMEM data routing framework described herein. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. However, it is to be appreciated that embodiments are not limited to using Blockstack as a decentralized identity management system, and thus embodiments are more generally applicable to any other suitable, non-Blockstack based, decentralized identity management system.

In general, Blockstack uses a blockchain to bind a digital property, such as a name, to a given value. Immutability and therefore trust are provided in a decentralized manner by allowing for any new node in the system to independently verify data bindings through a blockchain layer.

As used herein, the terms "blockchain," "digital ledger" and "blockchain digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol with a Blockstack naming system and that embodiments of the invention are not limited to the above or any particular blockchain protocol or naming system implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 7:
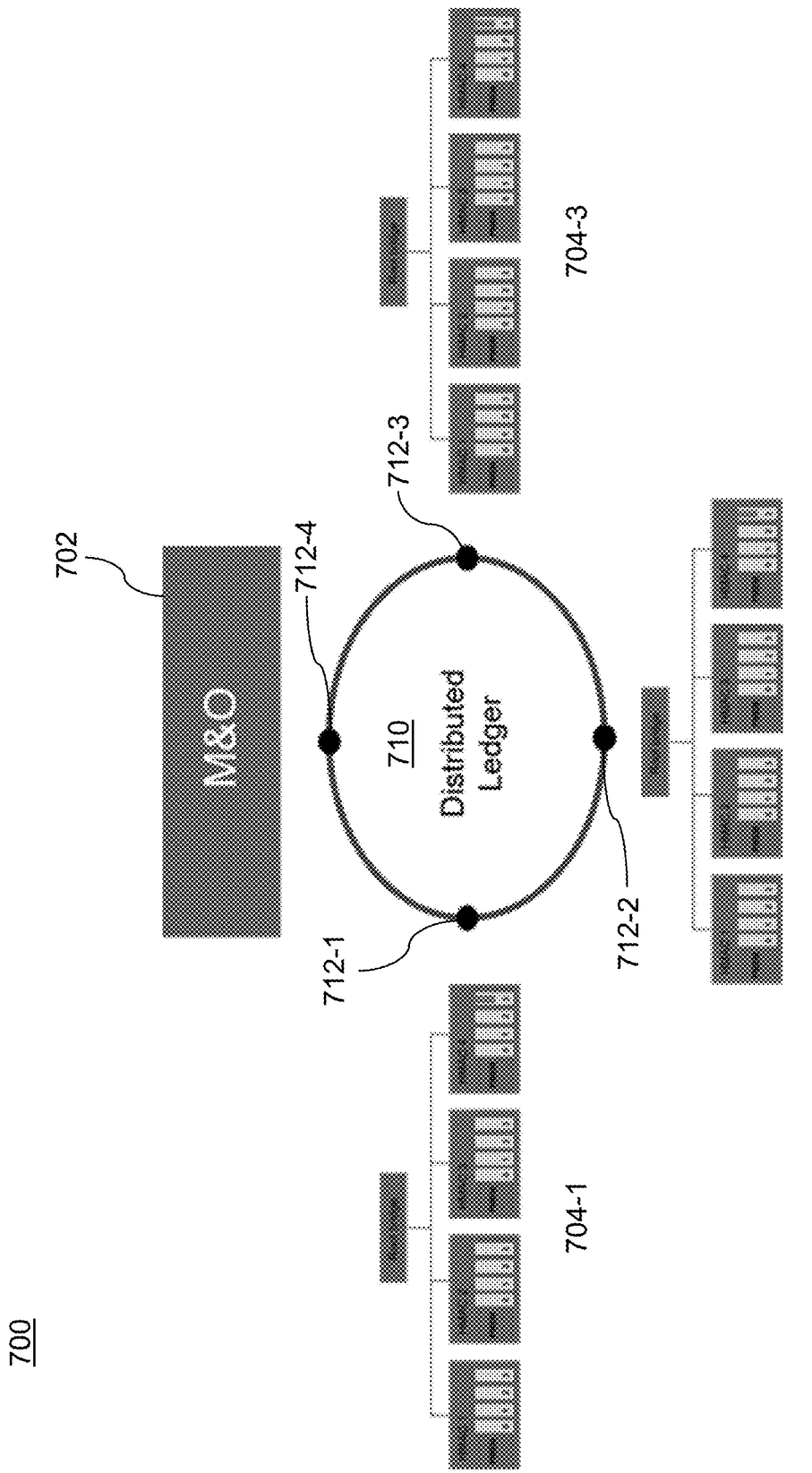
FIG. 7 illustrates a system for decentralized access management in an information processing system that utilizes persistent memory, according to an illustrative embodiment.
Figure 8:
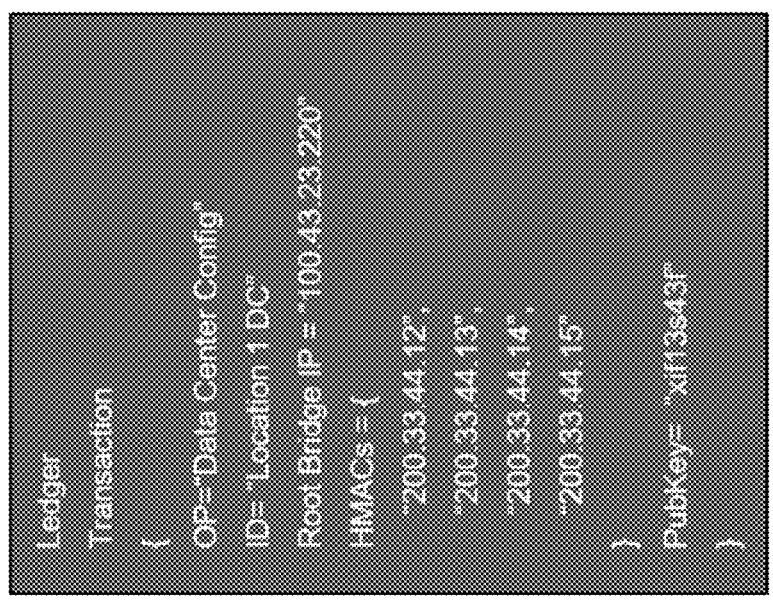
FIG. 8 illustrates a ledger transaction containing persistent memory routing information, according to an illustrative embodiment.
Figure 9:
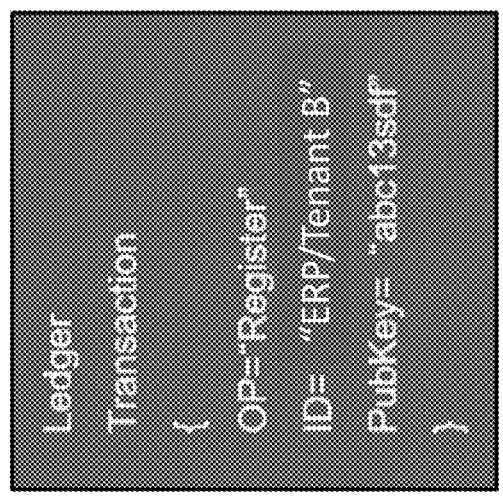
FIG. 9 illustrates a ledger transaction containing identity registration information, according to an illustrative embodiment.

Turning now to FIG. 7, a system 700 for decentralized access management in an information processing system that utilizes persistent memory is shown. More particularly, system 700 illustrates a PMEM data routing framework similar to that the one illustrated in FIG. 5. That is, management and orchestration (M&O) system 702 represents networking orchestration software (506 in FIG. 5) that is configured to, in response to an application deployment request or a container deployment request, choose the appropriate data center among a set of data centers 704-1, 704-2 and 704-3 based on hash values (504 in FIG. 5) representing PMEM data routing information generated and stored as explained above.

As further shown, the PMEM data routing framework in FIG. 7 comprises a distributed ledger system 710 with a plurality of ledger nodes 712-1, 712-2, 712-3 and 712-4. Ledger nodes 712-1, 712-2, 712-3 and 712-4, in one or more illustrative embodiments, are a plurality of blockchain nodes operatively coupled to form a distributed data access management ledger system (i.e., ledger system 710). A given blockchain node or BCN in the ledger system serves as a local BCN for a given one of the data centers 704-1, 704-2 and 704-3 or M&O system 702. In addition, in one or more illustrative embodiments, each BCN is further configured to support a distributed identity system such as the above-mentioned Blockstack identity system.

Still further, each data center operator providing PMEM service (e.g., 704-1, 704-2 and 704-3 in FIG. 7) is assigned a unique cryptographic key pair with a public key and a private key. Each data center uses its private key to digitally publish (and sign) their data center configurations through their local ledger node onto the distributed ledger system 710. Advantageously, a ledger is created which is exclusively dedicated to the operation of the PMEM data routing framework. This ledger can be constructed based on the number of root bridge nodes that participate in the PMEM data routing configuration.

Each data center operator providing PMEM services (e.g., data center location 704-1 referenced as "Location 1 DC") creates a ledger transaction highlighting the routing information for their PMEM configurations. An example of Location 1 publishing this information (and signing using their private key) is illustrated as ledger transaction 800 in FIG. 8.

In addition to digitally signing the core routing IP addresses, the data center provider can also provide other security information that can be recorded in the ledger including, but not limited to: (i) signed information identifying hardware (HW)/built-in operating system (BIOS)/firmware; and (ii) a signed OS image.

Furthermore, each application/tenant possesses a private key (part of a public key/private key pair) known only by either the user of the system (e.g., data center) and/or the M&O system 702. For example, an enterprise resource planning (ERP) application can be run by a tenant known as "Tenant B". The "ERP/Tenant B" identity can be "registered" on the distributed ledger 710 that spans the PMEM data routing framework depicted in FIG. 7. In one or more illustrative embodiments, this registration can occur using techniques such as those employed by the Blockstack identity system. This results in the "ERP/Tenant B" identity being associated with a public key within a ledger entry, depicted in ledger transaction 900 in FIG. 9.

Still further, when a set of PMEM storage locations are bound to an application/tenant identity, this binding can also be stored into the ledger, and the binding is also digitally signed using a private key (of a public/private key pair) of the application/tenant. Using the PMEM hashes depicted in FIG. 4 as an example, a PMEM allocation entry is created for the binding. An example of this is shown as ledger transaction 1000 in FIG. 10.

In one or more illustrative embodiments, in addition to the information provided above, the container (or a microservice) may have a signed application image as well.

When an application is deployed by the M&O system 702 (FIG. 7) to a server that contains the PMEM storage for that application, it is accompanied by a digital signature which contains the public key. For example, if the ERP application is assigned as a set of containers to server "HMAC4," the public key for identity "ERP/Tenant B" also accompanies the container assignment request.

Figure 11:
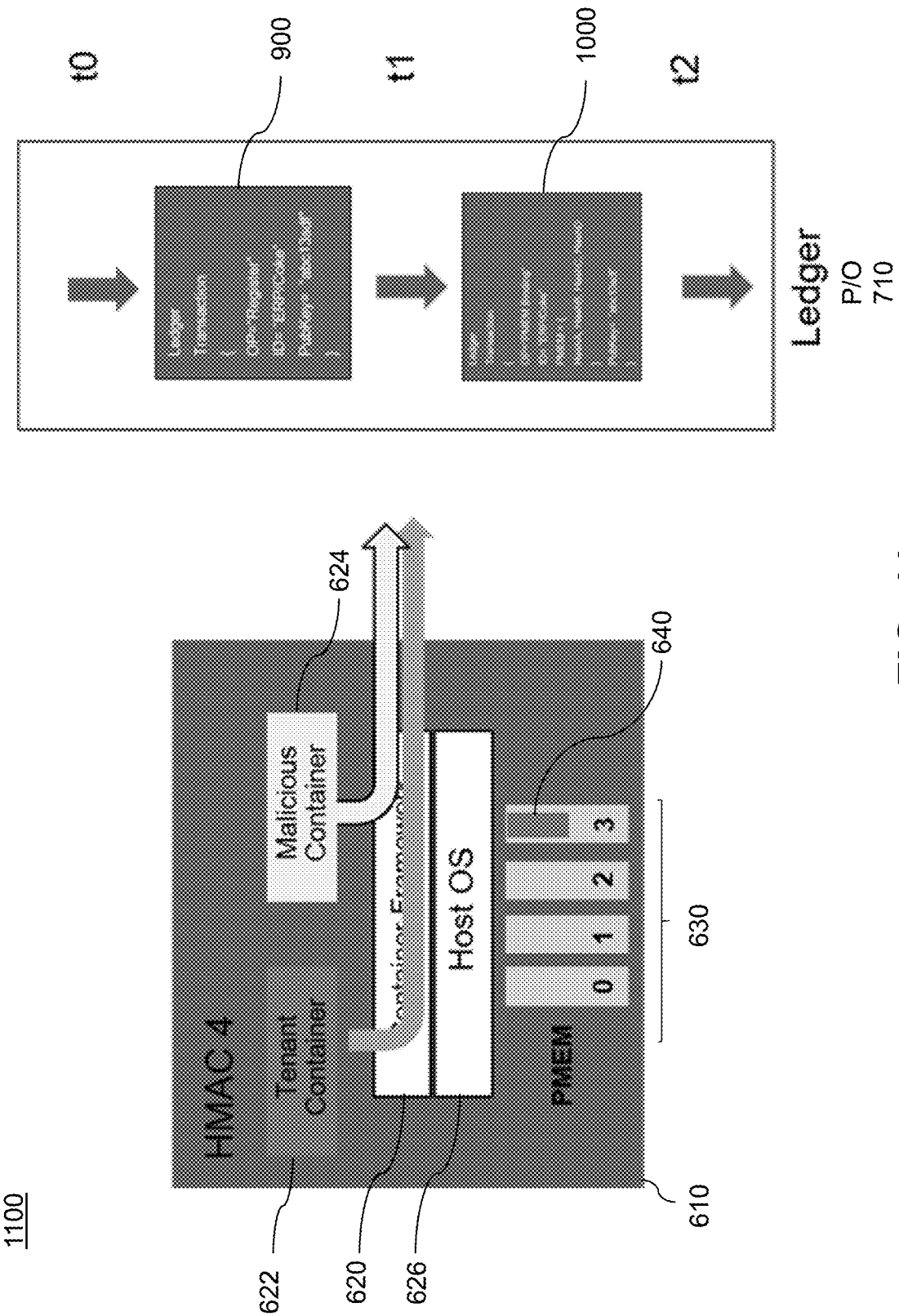
FIG. 11 illustrates an example of ledger consultation associated with a persistent memory allocation request, according to an illustrative embodiment.

When a signed container allocation request is received by a server, it can consult the ledger to verify that the public key accompanying the request correctly identifies the application and tenant that has been bound to the PMEM locations. Example 1100 in FIG. 11 shows this ledger consultation for the server 610 from FIG. 6. Recall that the server 610 has two containers executing, i.e., the legitimate tenant container 622 and the malicious container 624. The example shows the server accessing the ledger system 710 to verify the ledger transactions 900 (allocation/tenant identity ledger entry) and 1000 (PMEM allocation entry is created for the binding) to determine that the access request from tenant container 622 is an authentic request while the access request from malicious container 624 is a malicious request.

Thus, advantageously, when the application arrives at the correct data center containing the correct PMEM data slots, the mapping of the application to those PMEM locations is carried out and then recorded in the distributed ledger system (710 in FIG. 7) using the data center operator's private key. This signature proves that a rogue operator (e.g., malicious container 624) did not impersonate the hardware (because they do not possess the correct private key).

In one or more further illustrative embodiments, if a tenant/application identity wishes to extend access to a second entity, they can extend permissions to that entity by generating a signed transaction specifying access privileges to the second identity. This means that the validating server must consult the ledger system (710 in FIG. 7) and locate this "extend permissions" transaction to validate the second application/tenant.

At least portions of the information processing systems and processes shown in FIGS. 1-11 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 12.

As is apparent from the above, one or more of the processing modules or other components of the information processing systems and processes shown in FIGS. 1-11 may each run on a computer, server, storage device or other processing platform element. A given such element may be viewed as an example of what is more generally referred to herein as a "processing device." An example of such a processing platform is processing platform 1200 shown in FIG. 12.

The processing platform 1200 in this embodiment comprises a plurality of processing devices, denoted 1202-1, 1202-2, 1202-3, . . . 1202-N, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 12:
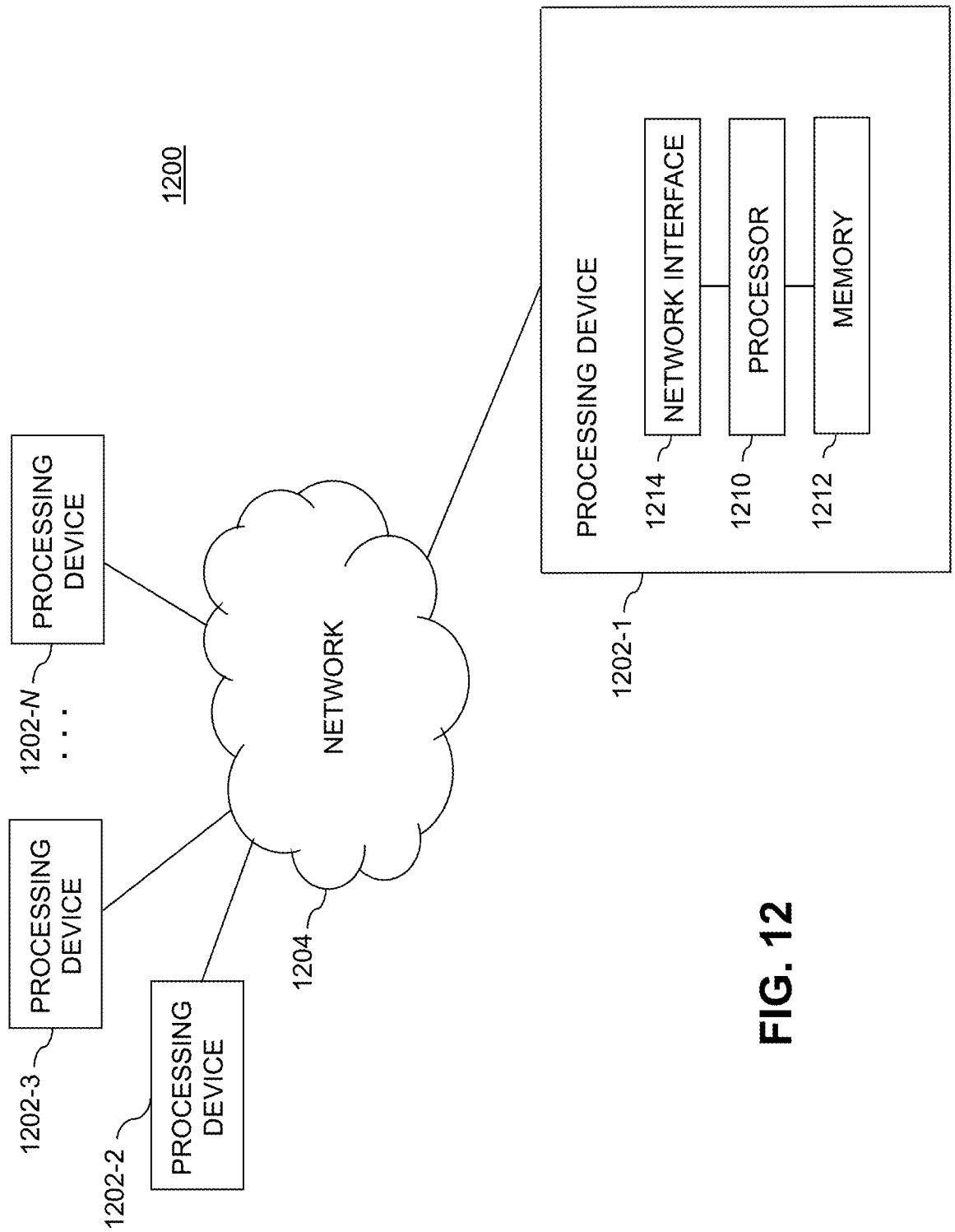
FIG. 12 illustrates a processing platform used to implement an information processing system that utilizes persistent memory as a primary data store with decentralized access management, according to an illustrative embodiment.

Also included in the processing device 1202-1 of the example embodiment of FIG. 12 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of an information processing system(s), although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of an information processing system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the information processing systems and processes described herein. Such components can communicate with other elements of the system over any type of network or other communication media.

As indicated previously, in some embodiments, components of information processing systems and processes as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in an information processing system comprising a set of computing devices wherein each computing device comprises a set of persistent memory modules resident in the computing device, and wherein one or more data structures associate one or more application programs executing on the set of computing devices with one or more memory regions of the set of persistent memory modules such that the one or more data structures are utilized to route data between a given one of the application programs and at least one memory region;
   maintaining a distributed ledger system with a plurality of nodes, wherein the set of computing devices is operatively coupled to the plurality of nodes of the distributed ledger system; and
   managing one or more data access requests by a given application program to a memory region of a persistent memory module in consultation with the distributed ledger system by storing transaction data in the distributed ledger system that represents at least one of routing information, identity information, and binding information associated with the one or more application programs and the set of persistent memory modules;
   wherein the association generated by the one or more data structures forms a per tenant binding between a given one of the application programs and at least one memory region; and
   wherein the method is implemented via one or more processing devices each comprising a processor coupled to a memory.

2. The method of claim 1, wherein the data access managing step further comprises verifying the identity of the given application program making the one or more data access requests based on the transaction data stored in the distributed ledger system.

3. The method of claim 2, wherein the data access managing step further comprises rejecting the one or more data access requests when the identity of the given application program making the one or more data access requests is not verified.

4. The method of claim 1, wherein the set of computing devices are associated with one or more data centers, and further comprising:
   assigning a unique cryptographic private key to each of the one or more data centers to enable the one or more data centers to sign and publish their configurations on the distributed ledger system using their assigned cryptographic private key.

5. The method of claim 4, wherein each of the one or more data centers creates transaction data stored in the distributed ledger system specifying routing information for their configuration.

6. The method of claim 5, wherein the configuration is represented by a mapping of a given application program to the one or more memory regions of the set of persistent memory modules associated with computing devices of the given data center.

7. The method of claim 6, wherein the mapping is stored as transaction data in the distributed ledger system.

8. The method of claim 4, wherein each of the one or more data centers creates transaction data stored in the distributed ledger system specifying security information.

9. The method of claim 1, further comprising assigning a unique cryptographic private key to each of the one or more application programs to enable the one or more application programs to sign and publish identity information on the distributed ledger system as transaction data using their assigned cryptographic private key.

10. The method of claim 9, wherein the unique cryptographic private key assigned to each of the one or more application programs is also used to sign and publish binding information on the distributed ledger system as transaction data.

11. The method of claim 10, wherein the binding information specifies a binding between a given one of the application programs and one or more memory regions of a given one of the persistent memory modules.

12. The method of claim 9, wherein a unique cryptographic public key, associated with the assigned cryptographic private key as part of a key pair, is assigned to each of the one or more application programs.

13. The method of claim 12, further comprising providing the cryptographic public key for a given one of the application programs to a given one of the set of computing devices to which the given application program is deployed via a container assignment request.

14. The method of claim 1, further comprising one of the application programs extending data access permission to another one of the application programs by creating transaction data that specifies the extended permission and storing the transaction data in the distributed ledger system.

15. The method of claim 14, further comprising a given one of the computing devices validating the other application program by consulting the transaction data stored on the distributed ledger system to verify the extended permission.

16. The method of claim 1, wherein the one or more data structures further comprise an identifier field for specifying the given one of the application programs and the given tenant.

17. A system comprising:
one or more processing devices operatively coupled to one or more memories having program logic, which when executed by the one or more processing devices, are configured to:
in an information processing system comprising a set of computing devices wherein each computing device comprises a set of persistent memory modules resident in the computing device, and wherein one or more data structures associate one or more application programs executing on the set of computing devices with one or more memory regions of the set of persistent memory modules such that the one or more data structures are utilized to route data between a given one of the application programs and at least one memory region;
maintain a distributed ledger system with a plurality of nodes, wherein the set of computing devices is operatively coupled to the plurality of nodes of the distributed ledger system; and
manage one or more data access requests by a given application program to a memory region of a persistent memory module in consultation with the distributed ledger system by storing transaction data in the distributed ledger system that represents at least one of routing information, identity information, and binding information associated with the one or more application programs and the set of persistent memory modules;
wherein the association generated by the one or more data structures forms a per tenant binding between a given one of the application programs and at least one memory region.

18. The system of claim 17, wherein the program logic, which when executed by the one or more processing devices, is configured to perform at least one of the following:
a) assigning a unique cryptographic private key to each of the one or more application programs to enable the one or more application programs to sign and publish identity information on the distributed ledger system as transaction data using their assigned cryptographic private key;
wherein the unique cryptographic private key assigned to each of the one or more application programs is also used to sign and publish binding information on the distributed ledger system as transaction data; and
wherein the binding information specifies a binding between a given one of the application programs and one or more memory regions of a given one of the persistent memory modules; and
b) extending by one of the application programs data access permission to another one of the application programs by creating transaction data that specifies the extended permission and storing the transaction data in the distributed ledger system.

19. An article of manufacture comprising a non-transitory processor-readable storage medium having stored therein program code of one or more software programs, wherein the program code when executed by at least one processor causes said at least one processor to:
in an information processing system comprising a set of computing devices wherein each computing device comprises a set of persistent memory modules resident in the computing device, and wherein one or more data structures associate one or more application programs executing on the set of computing devices with one or more memory regions of the set of persistent memory modules such that the one or more data structures are utilized to route data between a given one of the application programs and at least one memory region;
maintain a distributed ledger system with a plurality of nodes, wherein the set of computing devices is operatively coupled to the plurality of nodes of the distributed ledger system; and
manage one or more data access requests by a given application program to a memory region of a persistent memory module in consultation with the distributed ledger system by storing transaction data in the distributed ledger system that represents at least one of routing information, identity information, and binding information associated with the one or more application programs and the set of persistent memory modules;
wherein the association generated by the one or more data structures forms a per tenant binding between a given one of the application programs and at least one memory region.

20. The article of manufacture of claim 19, wherein the program code when executed by at least one processor causes said at least one processor to perform at least one of the following:
a) assign a unique cryptographic private key to each of the one or more application programs to enable the one or more application programs to sign and publish identity information on the distributed ledger system as transaction data using their assigned cryptographic private key;
wherein the unique cryptographic private key assigned to each of the one or more application programs is also used to sign and publish binding information on the distributed ledger system as transaction data; and
wherein the binding information specifies a binding between a given one of the application programs and one or more memory regions of a given one of the persistent memory modules; and
b) extend by one of the application programs data access permission to another one of the application programs by creating transaction data that specifies the extended permission and storing the transaction data in the distributed ledger system.

* * * * *